United States Patent
Brichta et al.

[11] Patent Number: 5,848,421
[45] Date of Patent: Dec. 8, 1998

[54] SYSTEM AND METHOD FOR CATALOG MAINTENANCE AND UTILIZATION

[75] Inventors: Harriet Elaine Brichta; Mark A. Trio; Lee R. Wilson; Jim W. Gunnels, all of Plano, Tex.; Robert J. Muhme, Fraser, Mich.

[73] Assignee: Electronic Data Systems Corporation, Plano, Tex.

[21] Appl. No.: 668,018

[22] Filed: Jun. 17, 1996

[51] Int. Cl.[6] ............................................... G06F 17/30
[52] U.S. Cl. ...................... 707/200; 707/203; 707/206; 707/1; 707/10
[58] Field of Search ................. 707/200, 1, 2, 707/204, 203, 206, 10

[56] References Cited

U.S. PATENT DOCUMENTS

| | | | |
|---|---|---|---|
| 5,295,261 | 3/1994 | Simonetti | 707/2 |
| 5,317,728 | 5/1994 | Tevis et al. | 707/204 |
| 5,491,818 | 2/1996 | Malatesta et al. | 707/201 |
| 5,555,388 | 9/1996 | Shaughnessy | 711/100 |
| 5,588,143 | 12/1996 | Stupek, Jr. et al. | 395/500 |
| 5,613,097 | 3/1997 | Bates et al. | 395/500 |
| 5,648,900 | 7/1997 | Bowen et al. | 707/5 |
| 5,664,186 | 9/1997 | Bennett et al. | 707/204 |
| 5,717,925 | 2/1998 | Harper et al. | 707/102 |

OTHER PUBLICATIONS

Catalogs on Disk, http://www.swmm.com/catalog.htm, Dec. 1995.

Primary Examiner—Thomas G. Black
Assistant Examiner—Greta L. Robinson
Attorney, Agent, or Firm—Wei Wei Jeang; L. Joy Griebenow

[57] ABSTRACT

A system (10) for maintaining and accessing a catalog database (36) includes a catalog database upgrade system (34). The system (10) also includes a catalog database navigator system (56). The catalog database upgrade system (34) is capable of adding items to a catalog database (36) and modifying items in the catalog database (36). The catalog database navigator system (56) is capable of locating items in the catalog database (36).

21 Claims, 6 Drawing Sheets

SYSTEM AND METHOD FOR CATALOG MAINTENANCE AND UTILIZATION

TECHNICAL FIELD OF THE INVENTION

This invention relates in general to the field of database management, more particularly, to a method and system for updating and accessing a catalog.

BACKGROUND OF THE INVENTION

A catalog is a database that is a critical component for procurement and asset management systems. Two important aspects of a catalog are maintaining consistent item naming, and ensuring accurate item categorizations.

Maintaining consistent item naming is important for many reasons. For example, a catalog may be used to leverage acquisitions, manage assets, and contain problems. Consistent item naming is important to keep an accurate inventory, detect item level patterns or trends in problems, correct item level problems reported by vendors, leverage item level acquisitions, and leverage maintenance contracts. For example, where identical items are entered into a catalog under similar but different item names, it may be difficult or impossible to utilize or obtain quantity discounts on upgrades or maintenance items.

Likewise, accurate item categorizations are important for many reasons. When adding to or referencing a catalog, accurate and clear item categorizations are necessary in order to find items quickly and to properly characterize items. The problems noted above regarding improper item naming may also be encountered when item categorization is faulty.

In many present database applications, problems with inconsistent item naming and inaccurate item categorization may be difficult to identify. Items with similar names may be present in multiple categories. It may be difficult to identify an item that has been included in an improper category or to correct an improper categorization or identification of an item.

Furthermore, in many applications, the catalog provider, catalog item provider, and catalog user will have inconsistent and varying systems for accessing, updating, and maintaining the catalog. A catalog provider may use a software application that allows updates or modifications to be made to the catalog, but which creates a database that is difficult to use in software applications used by catalog item providers or catalog users.

Likewise, a catalog item provider may provide a small percentage of the items in any given catalog, and may use software applications that are incapable of interfacing with the software systems or databases of the catalog provider. Furthermore, software applications for catalog users are not widely used, and catalog users must often rely only on hardcopy versions of a catalog.

SUMMARY OF THE INVENTION

Therefore, a need has arisen for a system and method for updating and accessing a catalog that substantially eliminates or reduces disadvantages associated with prior systems and methods.

Accordingly, a coordinated system for use by catalog providers, catalog item providers, and catalog users is provided that helps to provide consistent item naming and accurate item categorization.

According to one embodiment of the present invention a system is provided for maintaining and accessing a catalog that includes a catalog upgrade system for adding or modifying items in a catalog database. The system includes a catalog navigator system for locating and selecting items in the catalog database, and may also include a catalog modification system for modifying items in a catalog database.

One important technical advantage of the present invention is that a coordinated system for catalog access, upgrading, and maintenance is provided. Access to a catalog by the catalog providers, catalog item providers, and catalog users may be coordinated with the system of the present invention. Another important technical advantage of the present invention is that inconsistent item naming can be easily detected and corrected.

Yet another important technical advantage of the present invention is that improper item categorizations can be quickly identified and corrected.

BRIEF DESCRIPTION OF THE DRAWINGS

For a more complete understanding of the present invention and the advantages thereof, reference is now made to the following description taken in conjunction with the accompanying drawings, in which like reference numbers indicate like features and wherein.

Figure 1:
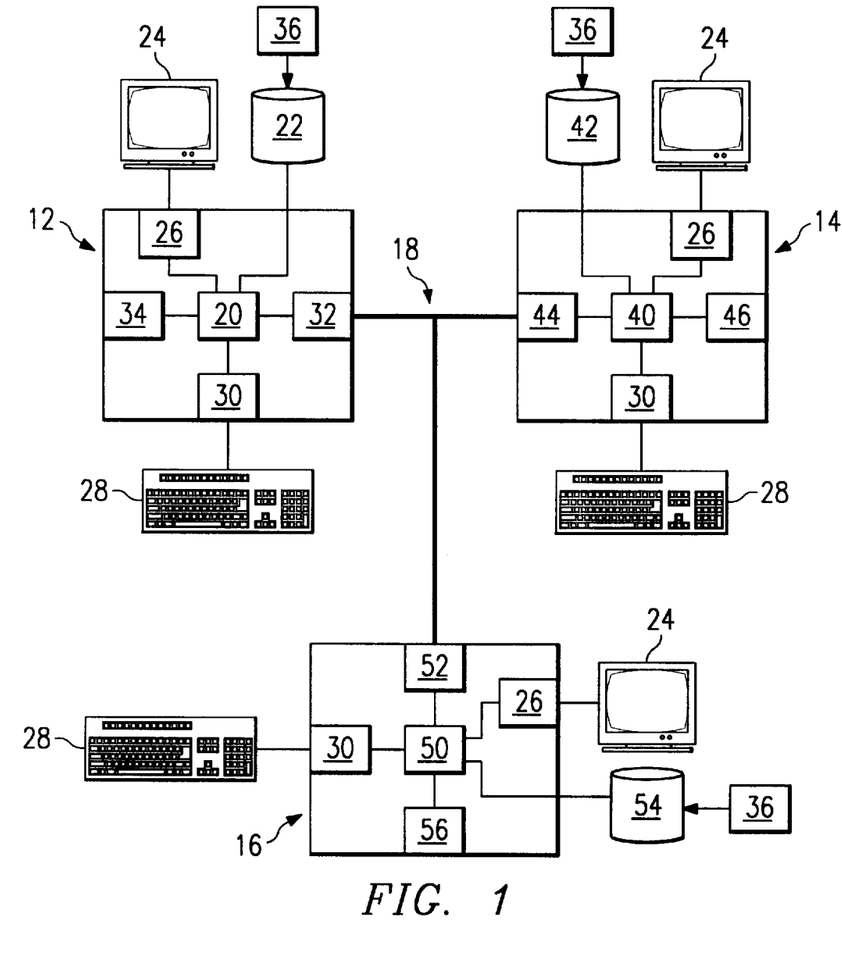
FIG. 1 is a schematic diagram of an exemplary system for improved catalog upgrade and maintenance in accordance with teachings of the present invention.

DETAILED DESCRIPTION OF THE INVENTION:

FIG. 1 is a schematic diagram of an exemplary system for improved catalog upgrade and maintenance constructed in accordance with teachings of the present invention. System 10 includes catalog provider facility 12, item provider facility 14, and catalog user facility 16. Catalog provider facility 12, item provider facility 14, and catalog user facility 16 are coupled to communications medium 18. In general, a catalog is a specialized database containing information pertaining to items in an inventory. Accordingly, the present invention may also be used in suitable database applications that do not involve catalogs, but is hereafter described in regards to a catalog application.

Catalog provider facility 12 includes operating system 20, data storage system 22, display 24, display interface system 26, data entry device 28, data input interface system 30, communications medium interface system 32, and catalog upgrade system 34. Catalog provider facility 12 may comprise a personal computer having a microprocessor, random access memory (RAM), and other typical components. Catalog provider facility 12 may alternately comprise other suitable data processing systems, such as a workstation or a laptop computer, that function to operate and support operating system 20, data storage system 22, display interface system 26, data input interface system 30, communications medium interface system 32, and catalog upgrade system 34. Catalog provider facility 12 may include one or more microprocessors and various add-on modules such as network interface cards, printer cards, sound cards, CD-Rom drive interface cards, and modem cards.

Operating system 20 is a software application operating on catalog provider facility 12 and communicates with data storage system 22, display interface system 26, catalog upgrade system 34, data input interface system 30, and communications medium interface system 32. Operating system 20 may comprise one or more software applications. Operating system 20 enables and facilitates various operations of catalog provider facility 12, and coordinates some operations of other systems operating on catalog provider facility 12.

Data storage system 22 may comprise a data memory device that is operable to store digital data, for example, on a magnetic storage medium. Data storage system 22 may comprise a variety of suitable data memory devices, such as a Bernoulli drive, a floppy disk, a tape storage drive, and an optical data storage drive. Data storage system 22 couples to operating system 20, and contains catalog database 36.

Display 24 is a visual display that is operable to display data and graphic images. Display 24 may comprise a cathode ray tube (CRT) display or other suitable displays, such as a liquid crystal diode display or a holographic display. Display 24 couples to display interface system 26.

Display interface system 26 is a software application which operates on catalog provider facility 12 and enables and facilitates various operations of catalog provider facility 12. Display interface system 26 may comprise one or more computer programs. Display interface system 26 communicates with display 24 and operating system 20. Display interface system 26 receives data from operating system 20 and transforms the data into a signal for display on display 24.

Data input interface system 30 is a software application which operates on catalog provider facility 12 and enables certain operations of catalog provider facility 12, such as receiving data from data entry device 28 and transmitting the data to operating system 20. Data input interface system 30 may comprise one or more computer programs. Data input interface system 30 communicates with operating system 20 and data entry device 28.

Communications medium interface system 32 is a software application which operates on catalog provider facility 12 and enables certain operations of catalog provider facility 12, such as receiving data from and transmitting data to operating system 20 and communications medium 18. Communications medium interface system 32 may comprise one or more computer programs. Communications medium interface system 32 couples to communication medium 18 and operating system 20.

Data entry device 28 is operable to generate data in response to a user input. Data entry device 28 is shown in FIG. 1 as a keyboard, but may comprise one or more suitable data entry devices, including a light pen or an X-Y pointing device such as a mouse or track ball.

Catalog upgrade system 34 is a software application which operates on catalog provider facility 12 and enables certain operations of catalog provider facility 12. Catalog upgrade system 34 may include one or more computer programs. Catalog upgrade system 34 communicates with operating system 20, and performs functions that are further described with reference to FIGS. 2, 3, and 4. In general terms, catalog upgrade system 34 is a database upgrade system.

Communications medium 18 is used to transmit data between catalog provider facility 12, item provider facility 14, and catalog user facility 16. Communications medium 18 may comprise suitable communications media, preferably having large data transfer bandwidth, such as a twisted conductor pair, a coaxial cable, a fiber-optic cable, or other communications media.

Item provider facility 14 may comprise, for example, a personal computer and operates item provider facility 14, data storage system 42, display interface system 26, communications medium interface system 44, data input interface system 30, and catalog modification system 46.

Item provider operating system 40 is a software application which operates on item provider facility 14. Item provider operating system 40 may comprise one or more computer programs. Item provider operating system 40 communicates with data storage system 42, display interface system 26, communications medium interface system 44, data input interface system 30, and catalog modification system 46.

Data storage system 42 communicates with item provider operating system 40 and may comprise a data storage facility comparable in capabilities to data storage system 22 described previously.

Communications medium interface system 44 is a software application which operates on item provider facility 14 and enables certain operations of item provider facility 14, such as receiving data from and transmitting data to components coupled to communications medium 18. Communications medium interface system 44 may comprise one or more computer programs. Communications medium interface system 44 couples to communications medium 18 and item provider operating system 40.

Catalog modification system 46 is a software application which operates on item provider facility 14 and enables certain operations of item provider facility 14 which are further described with reference to FIGS. 2 through 4. Catalog modification system 46 may comprise one or more computer programs, and communicates with to item provider operating facility 40. In general terms, catalog modification system 46 is a database modification system.

Catalog user facility 16 may comprise, for example, a personal computer and operates catalog user operating system 50, communications medium interface system 52, data storage system 54, catalog navigator system 56, display interface system 26, and data input interface system 30. Catalog user facility 16 performs data processing functions and may alternately comprise other suitable data processors, such as a workstation, or a laptop computer. Catalog user facility 16 may include one or more processors that function to operate catalog user operating system 50, communications medium interface system 52, data storage system 54, catalog navigator system 56, display interface system 26, and data input interface system 30.

Catalog user operating system 50 is a software application which operates on catalog user facility 16 and enables certain operations of catalog user facility 16, such as coordination of other systems which operate on catalog user facility 16. Catalog user operating system 50 may comprise one or more computer programs, and communicates with communications medium interface system 52, data storage system 54, catalog navigator system 56, display interface system 26, and data input interface system 30.

Communications medium interface system 52 is a software application which operates on catalog user facility 16 and enables certain operations of catalog user facility 16, such as receiving data from and transmitting data to components coupled to communications medium 18. Communications medium interface system 52 may comprise one or more computer programs, and couples to communications medium 18 and catalog user operating system 50.

Data storage system 54 communicates with catalog user operating system 50 and may comprise a data storage facility comparable in capabilities to data storage system 22 described previously.

Figures 2, 3:
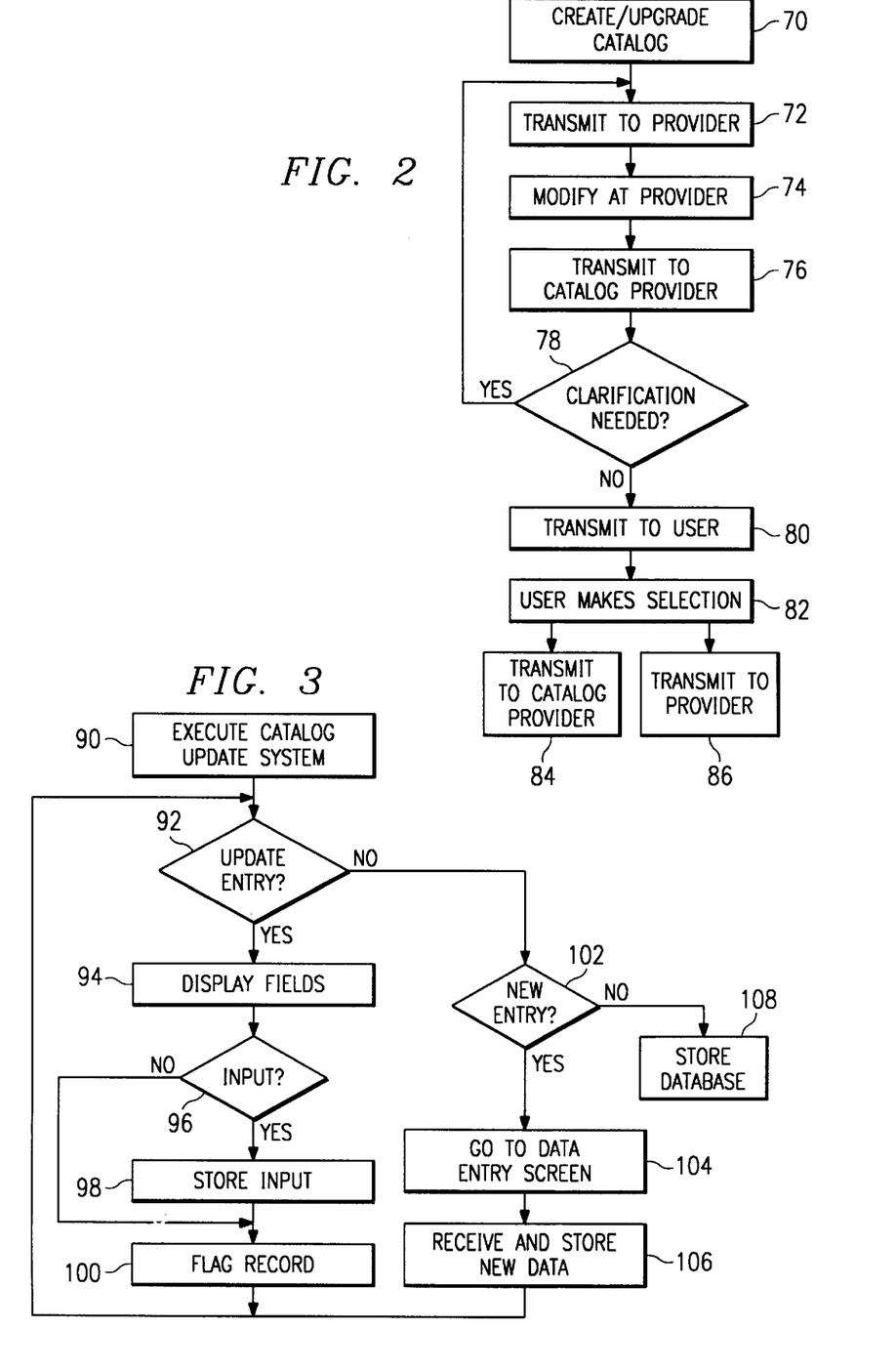
FIG. 2 is a flow chart of an exemplary method of operation of a system embodying concepts of the present invention.
FIG. 3 is a flow chart of an exemplary method for adding and modifying catalog entries in accordance with teachings of the present invention.
Figure 4:
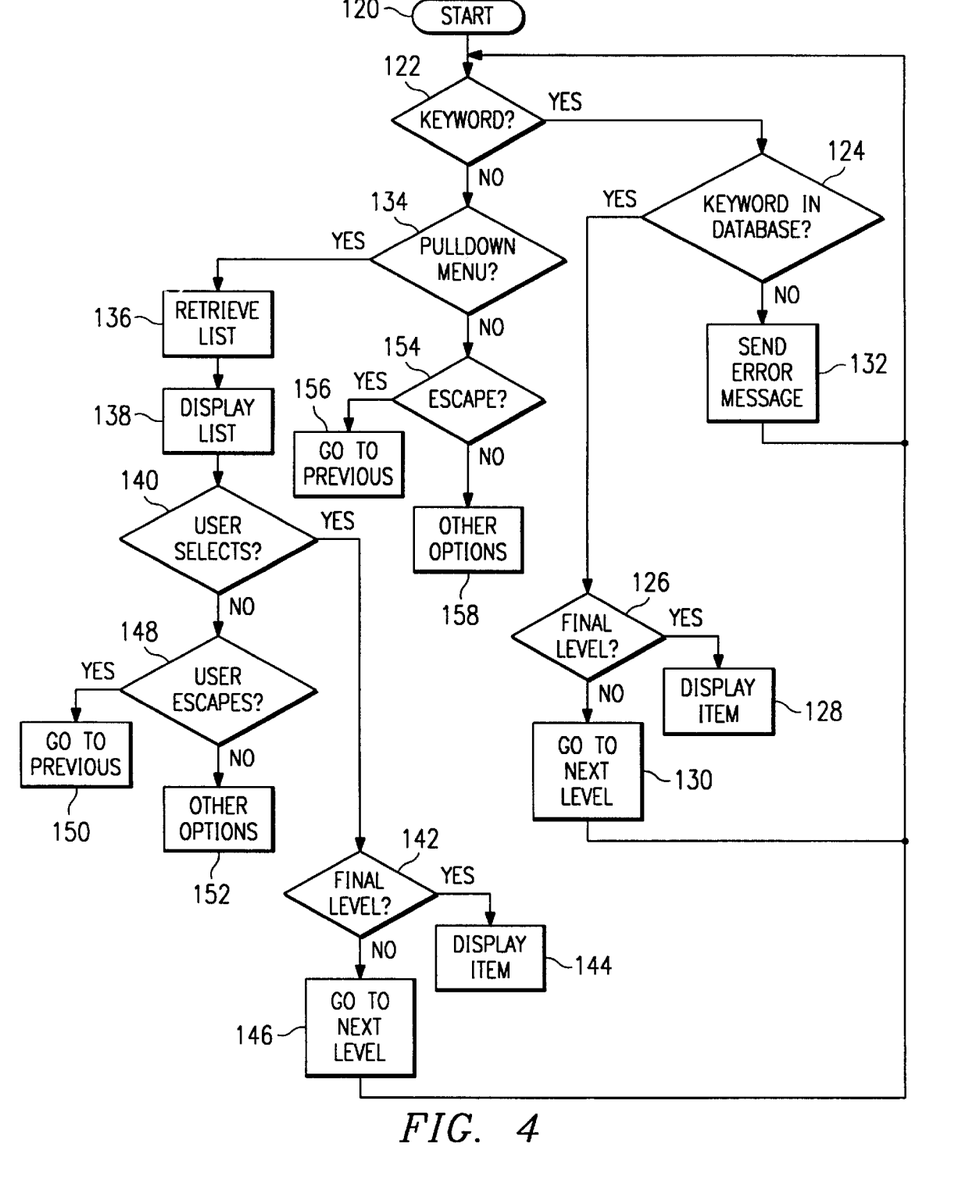
FIG. 4 is a flow chart of an exemplary method for catalog navigation embodying concepts of the present invention.

Catalog navigator system 56 is a software application which operates on catalog user facility 16 and enables certain operations of catalog user facility 16, which are further described in reference to FIGS. 2 through 4 of the present application. Catalog navigator system 56 may comprise one or more computer programs, and communicates with catalog user operating system 50. In general terms, catalog navigator system 56 is a database navigator system.

In operation, three separate systems are used to add items to a catalog database, modify a catalog database, and select items from the catalog database. A user at catalog provider facility 12 activates the first catalog upgrade system 34 by entering commands to operating system 20 through data entry device 28 and data input interface system 30. The user of catalog provider facility 12 then adds items to catalog database 36 or modifies items already stored on catalog database 36 using catalog upgrade system 34.

After the user at catalog provider facility 12 has completed additions and upgrades to catalog database 36, catalog database 36 is transmitted to item provider facility 14. Transmission of catalog database 36 may occur through the transmission path formed by operating system 20, communications medium interface system 32, communications medium 18, communications medium interface system 44, and item provider operating system 40. Likewise, catalog database 36 may be transmitted to item provider facility 14 in the form of a data file or files stored on a floppy disk or other tangible data storage media.

A user at item provider facility 14 then activates the second catalog modification system 46 by entering commands to item provider operating system 40 through data entry device 28 and data input interface system 30. The user at item provider facility 14 may then review the contents of catalog database 36 and may modify data fields of catalog database 36. After the user at item provider facility 14 has completed modifications and additions to catalog database 36, the revised catalog database 36 is transmitted back to catalog provider facility 12.

Upon receipt of revised catalog database 36, the user at catalog provider facility 12 reviews additions or modifications made by the user at item provider facility 14 using the first catalog upgrade system 34. These additions and changes may be flagged by item provider facility 14 in catalog database 36, to allow the user at catalog provider facility 12 to easily identify and quickly review modifications and additions.

After all modifications and additions to catalog database 36 have been reviewed by a user at catalog provider facility 12, catalog database 36 is ready for transmission to catalog user facility 16. Transmission of catalog database 36 to catalog user facility 16 may occur through the transmission path created by operating system 20, communications medium interface system 32, communications medium 18, communications medium interface system 52, and catalog user operating system 50. Catalog database 36 may be transmitted as a whole or in parts. Alternately, transmission of catalog database 36 may be accomplished by storing catalog database 36 on a computer disk or other suitable storage media and transmitting the tangible media from catalog provider facility 12 to catalog user facility 16.

A user at catalog user facility 16 activates the third catalog navigator system 56 by entering an appropriate command to catalog user operating system 50 through data entry device 28 and data input interface system 30. Catalog navigator system 56 allows the user at catalog user facility 16 to quickly locate items which the user desires to select from catalog database 36. The user's selections are flagged by catalog navigator system 56 and may be transmitted to catalog provider facility 12 via the transmission path formed by catalog user operating system 50, communications medium interface system 52, communications medium 18, communications medium interface system 32, and operating system 20.

Likewise, the selections made by a user at catalog user facility 16 may be transmitted to item provider facility 14 via the transmission path formed by catalog user operating system 50, communications medium interface system 52, communications medium 18, communications medium interface system 44, and item provider operating system 40.

Thus, using the three systems described herein, a catalog database may be maintained that allows inconsistent item naming to be easily detected and corrected. Furthermore, the three systems of the present invention allow improper item categorization to be quickly identified and corrected.

FIG. 2 is a flow chart of an exemplary method of operation of the system of FIG. 1 embodying concepts of the present invention. At step 70, a user at catalog provider facility 12 activates catalog upgrade system 34. The user of catalog provider facility 12 then adds or modifies catalog database 36. After all additions or modifications have been made to catalog database 36, catalog database 36 is transmitted to the item provider at step 72.

At step 74, the user at item provider facility 14 activates catalog modification system 46. The user at item provider facility 14 then makes changes to catalog database 36. For example, if the user at catalog provider facility 12 provided an incomplete description of an item in catalog database 36, the user at item provider facility 14 may modify or add additional description to data fields associated with the item in catalog database 36. After modification of catalog database 36 and item provider facility 14 is completed, catalog database 36 is transmitted back to catalog provider facility 12 at step 76.

At step 78, the user at catalog provider facility 12 determines whether further clarification is needed for items in catalog database 36. If further clarification is required, catalog database 36 is returned to item provider facility 14 at step 72 for further clarification or modification. Otherwise, catalog database 36 is transmitted to catalog user facility 16 at step 80. At step 82, a user at catalog user facility 16 makes selections from the catalog database 36. These selections may be either transmitted to the catalog provider at step 84, or transmitted to the item provider at step 86.

FIG. 3 is a flow chart of an exemplary method for adding and modifying catalog entries. This method may be implemented either at catalog provider facility 12, or item provider facility 14, but will be described in regards to catalog provider facility 12. At step 90, a user at catalog provider facility 12 executes catalog upgrade system 34 by entering commands to operating system 20 through data entry device 28 and data input interface system 30. The user at catalog provider facility 12 is presented with an input screen that may be similar to that shown in FIG. 5. At step 92, the user at catalog provider facility 12 may choose to either update an entry or to go forward and select the enter/new entry option. If the user at catalog provider facility 12 chooses to update an entry, the method proceeds to step 94. Otherwise, the method proceeds to step 102.

Figure 7:
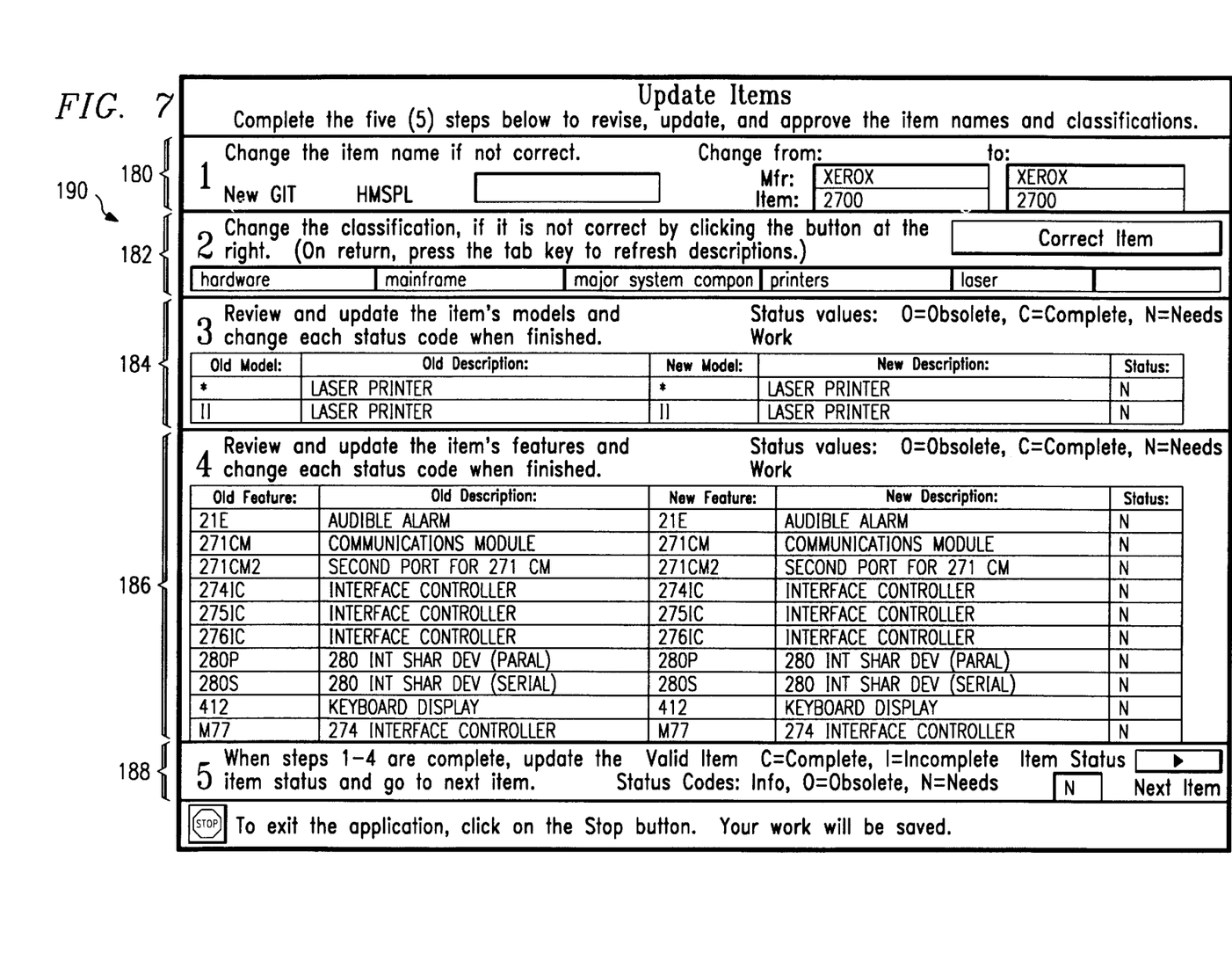
FIG. 7 shows an update item screen embodying concepts of the present invention.

At step 94, the data fields for a catalog entry are displayed on a screen similar to that shown in FIG. 7. At step 96, the user of catalog upgrade system 34 inputs data into the data fields. If no data is input, the method proceeds to step 100 and the item is flagged as having been viewed or modified. Otherwise, the method proceeds to step 98 where data fields is stored and catalog database 36 is modified. After modification, the method proceeds to step 100, and the record is flagged.

The method then proceeds to step 92, where the user of catalog upgrade system 34 may choose to either update a catalog entry or to enter a new catalog entry. If a new entry is selected, the method proceeds to step 102. Otherwise, the method ends at step 108 and catalog database 36 is stored on data storage system 22.

If a new entry is selected at step 102, the method proceeds to step 104. At step 104, the user of catalog upgrade system 34 enters data fields, for example, in a data screen similar to that shown in FIG. 7. After completion of all data entry, the method proceeds to step 106. At step 106, data from the data entry screen is received and stored in catalog database 36. The method then proceeds to step 92 where the user of catalog upgrade system 34 may again select to either update an existing entry or enter a new entry. After completion of all updates and entries, the method proceeds to step 108 where catalog database 36 is stored to data storage system 22.

The method of FIG. 3 may also be implemented at item provider facility 14 with catalog modification system 46. In one embodiment, the method shown in FIG. 3 may be implemented by catalog modification system 46 without any modifications. In an alternate embodiment, the method implemented by catalog modification system 46 may exclude steps 102, 104, and 106. In this alternate embodiment, any new entries should be provided to catalog provider facility 12 for entry. This method may be used to help ensure consistent item naming and accurate item categorizations.

Figure 6:
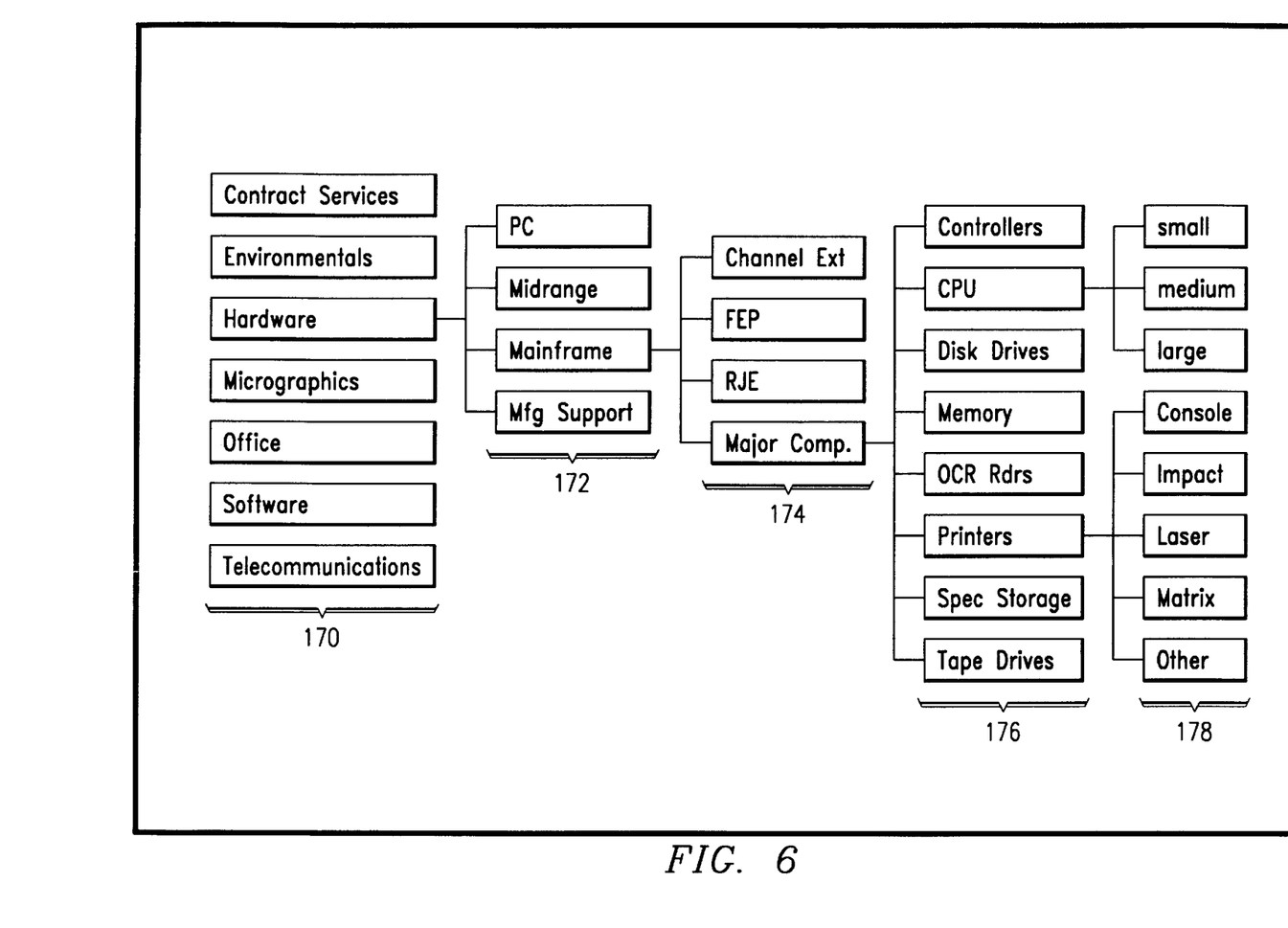
FIG. 6 shows a hierarchical database structure embodying concepts of the present invention.

FIG. 4 is a flow chart of an exemplary method for catalog navigation embodying concepts of the present invention. The method is used to search a hierarchical database, where each item in a first level is related to a list of items in a second level. Likewise, each item in each second list is further related to third level list, and so on until the final level is reached. An example of a hierarchical database is shown in FIG. 6.

The method starts at step 120, such as when a user of catalog navigator system 56 activates the catalog navigator by entering an appropriate operating system command. At step 122, a user of catalog user facility 16 is presented with an item selection screen such as that shown in FIG. 5. If a keyword is entered in the appropriate position, such as the first empty category box, the method proceeds to step 124, where the catalog navigator tests the keyword against other keywords in the database at the present level. If the keyword is in the database, the method proceeds to step 126, where the catalog navigator determines whether the keyword is at the final or lowest level of the database. If the keyword is at the lowest level, the catalog navigator proceeds to step 128 and displays the chosen item. Otherwise, the catalog navigator gets the list for the next database level at step 130, and returns to step 122 for the selection of the keyword for the next level.

If the keyword is not found in the data base at step 124, an error message is sent to the user of catalog navigator system 56 that notifies the user that the entered keyword was not a valid keyword. The method then returns to step 122 for entry of another keyword.

If the user of catalog navigator system 56 does not enter a keyword at step 122, the catalog navigator checks for a pull down menu prompt at step 134. If a pull down menu prompt has been entered, the catalog navigator retrieves the list of available keywords for the present level at step 136, and displays the list to the user at step 138. The list may include a scroll feature that allows a user to view only a portion of the entire list.

At step 140, a user of catalog navigator system 56 selects a keyword from the displayed list of keywords. The method then proceeds to step 142, determines whether the keyword is at the final or lowest level of the database. If the keyword is at the lowest level, the catalog navigator proceeds to step 144 and displays the chosen item. Otherwise, the catalog navigator gets the list for the next database level at step 146, and returns to step 122 for the selection of the keyword for the next level.

If the user does not select a keyword at step 140, the catalog navigator determines whether the user has selected escape at step 148, such as by selecting a key marked "escape" key on data entry device 28. If the user has selected escape at step 150, the method returns to the previous screen, which is the item selection screen. If the user has not selected escape, other options may be presented at step 152, such as an option for retrieving a help screen.

If the user does not select a pull down menu at step 134, the method proceeds to step 154 where the catalog navigator determines whether the user has selected escape. If the user has selected escape, the method proceeds to step 156, where the catalog navigator returns to the previous screen. For example, if the user of catalog navigator system 56 is presently at the third level of a database, the catalog navigator may return to the second level. Alternately, the catalog navigator may return to the screen from which the user activated the catalog navigator at step 120.

If the user has not selected escape at step 154, the method proceeds to step 158, where other options are presented, such as an option for retrieving a help screen. One skilled in the art will recognize that the steps shown in FIG. 4 may be altered, augmented, or deleted without departing from the spirit or the scope of the present invention. For example, the test for a pull down menu prompt at step 134 may occur simultaneously with or prior to step 122. Likewise, if no other options are presented, steps 152 and 158 may be deleted.

Figure 5:
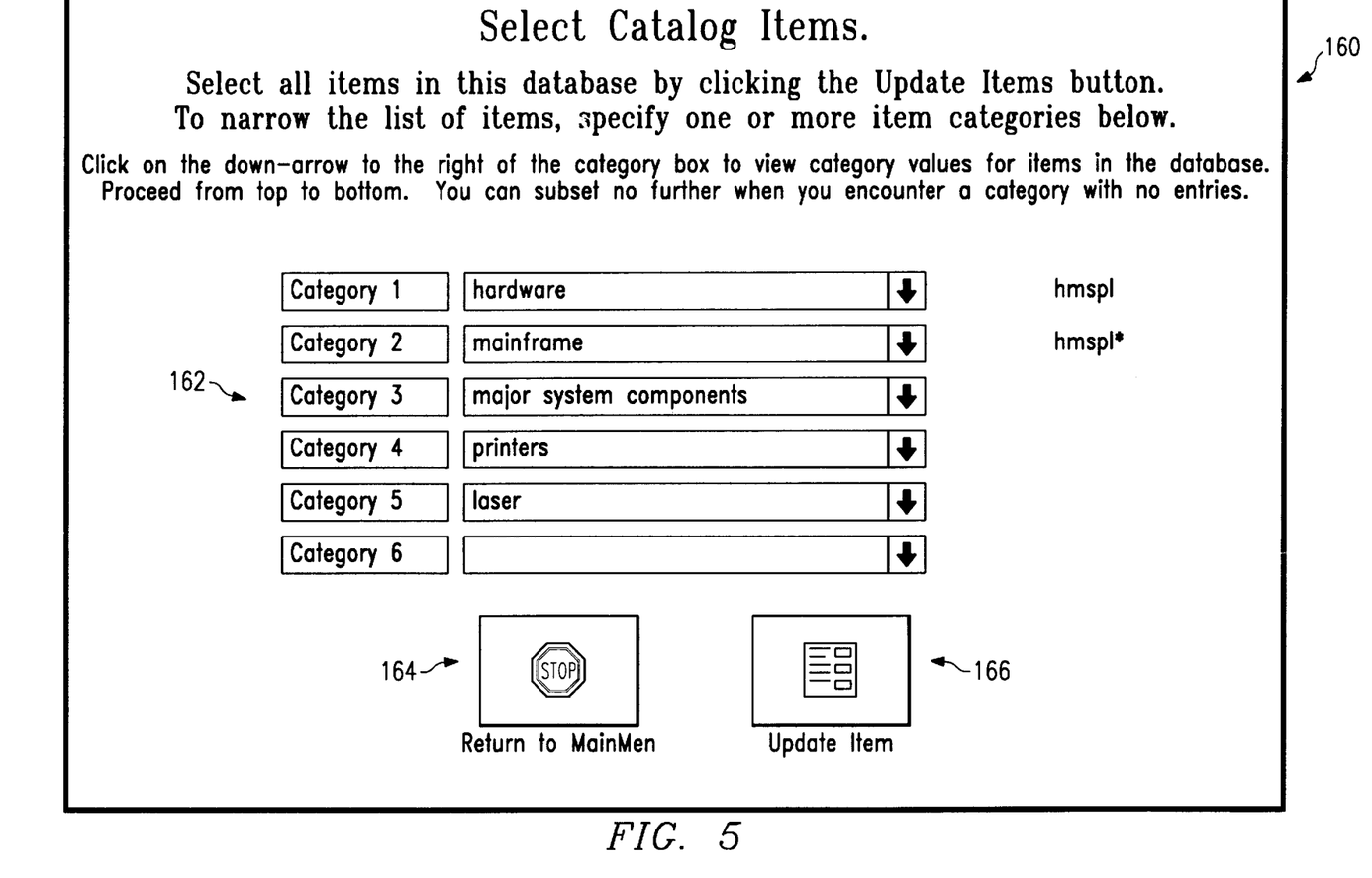
FIG. 5 is an example of an exemplary item selection screen that may be used in a method for catalog maintenance and utilization in accordance with teachings of the present invention.

FIG. 5 is an example of an exemplary item selection screen 160 that may be used in conjunction with the method shown in FIG. 3 or the method shown in FIG. 4. Item selection screen 160 includes option categories 162, stop button 164, and update item button 166. The user navigates through option selections 162 by entering a key word into the top-most vacant category. Item selection screen 160 as shown contains six categories. One skilled in the art will recognize that any suitable number of categories may be selected without departing from the spirit and scope of the present invention. Likewise, many suitable database structures may be used in accordance with teachings of the present invention, such as a relational database.

For example, the user of item selection screen 160 in the present example has entered "hardware" in category 1. Referring now to FIG. 6, which shows an exemplary hierarchical database structure embodying concepts of the present invention, the selection of hardware for category 1 can be seen in option column 170 of FIG. 6. By selecting the down arrow to the right of the category 1 option box in FIG. 5, the user may be presented with the options shown in option column 170 of FIG. 6. Alternately, the user may be provided with other options upon entry of a keyword. For example, as the user enters the letter H, the user may be presented with all options beginning with the letter H. In the present example, as shown in FIG. 6, this would comprise the single option "hardware".

Item selection may then proceed to the second level of the database shown in option column 172. Although option column 172 only shows the options for "hardware" in options column 170, every other item in options column 170 has an associated list of items corresponding to that shown in options column 172 for "hardware". A user of catalog navigator system 56 may then select an item from option column 172, such as "mainframe", and will then be presented with further options, such as those shown in options columns 174, 176, and 178. It should be noted that options column 178 includes options for "CPU" and "printers" from option column 176.

Item selection continues in this manner until the last category of options has been selected. For example, as shown in FIGS. 5 and 6, "laser" has been selected for category 5. This correlates to option class 178 in FIG. 6. If the user is unsatisfied with the item selected, the user may select stop button 164 of FIG. 5 to return to the main menu. Otherwise, the user may select update item button 166 and proceed to FIG. 7.

FIG. 7 shows update item screen 190 embodying concepts of the present invention. Update item screen 190 includes main selection block 180, classification correction block 182, item data block 184, item feature block 186, and item flag block 188. A user of update item screen 190 may modify any of the information shown in FIG. 7 for an existing item. For example, the item shown in item name block 180 is a "Xerox 2700". In item classification block 182, Xerox 2700 is identified as a piece of hardware, for use with a mainframe, a major system component, a printer, and a laser printer.

The user of update item screen 190 may select a more appropriate classification in classification block 182. For example, referring to FIG. 6, the user of update item screen 190 may change the "hardware" classification of options column 170 in FIG. 6 to the "office" classification of options column 170 in FIG. 6. Likewise, the user may change the "laser " classification of options column 178 in FIG. 6 to a "console" classification of options column 178 in FIG. 6.

After entry or correction of any desired information in blocks 180 through 186, the user of update item screen 190 may flag the completed item entry with an appropriate flag. For example, the options presented in status section 188 of FIG. 7 include "C" for complete, "I" for incomplete, "O" for obsolete, or "N" for needs work.

Select item screen 160 of FIG. 5 may also be used in conjunction with catalog navigator system 56 as previously noted. In this embodiment, "update item button 166" would be modified to "view item button 166," and a user of select item screen 160 would not be given the option to update the item. Instead, a user selecting an item would be presented with other options, such as the option to order the item from the catalog provider, or the option to order the item from the item producer.

Although the present invention has been described in detail, it should be understood the various changes, substitutions, and alterations can be made hereto without departing from the spirit and scope of the invention as defined by the appended claims.

What is claimed is:

1. A system for maintaining and accessing catalog items in a catalog database, the system comprising:

a catalog database upgrade system operable to retrieve catalog item data corresponding to a retrieved catalog item data field from the catalog database;

a modify item screen operable to present the retrieved catalog item data to a user for modification;

an add item screen operable to receive new catalog item data in a new catalog item data field from the user;

wherein the catalog database upgrade system is further operable to store the new catalog item data in the catalog database and to store the modified catalog item data in the catalog database;

a catalog database modification system operable to compare the new catalog item data in the new catalog item data field to catalog item data in other catalog item data fields, the catalog database modification system further operable to modify the new catalog item data to remove inconsistencies in response to comparing the data; and a catalog database navigator system operable to locate catalog items in the catalog database using catalog item data.

2. The system of claim 1 further comprising:

a pull-down menu control next to each item data field; and wherein the catalog database upgrade system is further operable to present a list of all available data entries for the catalog item data field when the pull-down menu control is activated.

3. The system of claim 1 wherein the catalog database navigator system further comprises:

a find item screen operable to display all available catalog item data fields associated with a catalog item;

a pull-down menu control next to each item catalog item data field; and wherein the catalog database navigator system is further operable to present a list of all available data entries for the catalog item data field when the pull-down menu control is activated.

4. The system of claim 1 wherein the catalog database navigator system further comprises:

a find item screen operable to accept entered catalog item data from the user; and wherein the catalog database navigator is further operable to retrieve catalog item data from the catalog database corresponding to the entered catalog item data.

5. A method for maintaining and accessing a catalog database, the catalog database having existing items having associated names, the method comprising the steps of:

creating a new item in a catalog database with a catalog database upgrade system, the new item having an associated name;

comparing the associated name of the new item to the associated names of the existing items in the catalog database with a catalog database modification system; and modifying the associated name of the new item in the catalog database with the catalog database modification system to correct inconsistent naming of items in response to the comparing step.

6. The method of claim 1 wherein the step of creating a new item in a catalog database further comprises the steps of:

displaying an add item screen on a display;

receiving data entered to a data field in the add item screen; and storing the data in the catalog database.

7. The method of claim 5 wherein the step of modifying the associated name of the new item further comprises the steps of:

retrieving the associated name of the new item from the catalog with the catalog database modification system;

displaying a modify item screen on a display that includes the retrieved associated name;

accepting user-entered modifications to the associated name; and storing the modified associated name in the catalog database.

8. The method of claim 5 and further comprising the step of selecting items from the catalog database with a catalog database navigator system.

9. The method of claim 8 wherein the step of selecting items further comprises the steps of:

displaying an item selection screen on a display;

receiving an input from a pull-down menu control;

displaying a list of acceptable choices for a data field; and receiving a selection from the list of acceptable choices.

10. The method of claim 5 wherein the existing items have associated categories and wherein the new item has an associated category and further comprising the steps of:

comparing the associated category of the new item to the associated categories of the existing items in the catalog database with a catalog database modification system; and modifying the associated category of the new item in the catalog database with the catalog database modification system to correct inconsistent item categorization in response to comparing the associated category of the new item to the associated categories of the existing items.

11. The method of claim 10 wherein the step of modifying the associated category of the new item further comprises the steps of:

retrieving the associated category of the new item from the catalog database with the catalog database modification system;

displaying a modify item screen on a display that includes the retrieved associated category;

accepting user-entered modifications to the associated category; and storing the modified associated category in the catalog database.

12. A method for maintaining and accessing a catalog database, the catalog database having existing items having associated categories, the method comprising the steps of:

creating a new item in a catalog database with a catalog database upgrade system, the new item having an associated category;

comparing the associated category of the new item to the associated categories of the existing items in the catalog database with a catalog database modification system; and modifying the associated category of the new item in the catalog database with the catalog database modification system to correct inconsistent item categorization in response to comparing the associated category of the new item to the associated categories of the existing items.

13. The method of claim 12 wherein the step of modifying the associated category of the new item further comprises the steps of:

retrieving the associated category of the new item from the catalog database with the catalog database modification system;

displaying a modify item screen on a display that includes the retrieved associated category;

accepting user-entered modifications to the associated category; and storing the modified associated category in the catalog database.

14. The method of claim 12 wherein the step of creating a new item in a catalog database further comprises the steps of:

displaying an add item screen on a display;

receiving data entered to a data field in the add item screen; and storing the data in the catalog database.

15. The method of claim 12 wherein the step of modifying the associated category of the new item further comprises the steps of:

retrieving the associated category of the new item from the catalog database with the catalog database modification system;

displaying a modify item screen on a display that includes the retrieved associated category;

accepting user-entered modifications to the associated category; and storing the modified associated category in the catalog database.

16. The method of claim 12 and further comprising the step of selecting items from the catalog database with a catalog database navigator system.

17. The method of claim 16 wherein the step of selecting items further comprises the steps of:

displaying an item selection screen on a display;

receiving an input from a pull-down menu control;

displaying a list of acceptable choices for a data field; and receiving a selection from the list of acceptable choices.

18. The method of claim 12 wherein the existing items have associated names and wherein the new item has associated names and further comprising the steps of:

comparing the associated name of the new item to the associated names of the existing items in the catalog database with a catalog database modification system;

modifying the associated name of the new item in the catalog database with the catalog database modification system to correct inconsistent naming of items in response to comparing the associated name of the new item to the associated names of the existing items.

19. The method of claim 18 wherein the step of modifying the associated name of the new item further comprises the steps of:

retrieving the associated name of the new item from the catalog database with the catalog database modification system;

displaying a modify item screen on a display that includes the retrieved associated name;

accepting user-entered modifications to the associated name; and storing the modified associated name in the catalog database.

20. The system of claim 1 wherein the catalog item data includes a catalog item name.

21. The system of claim 1 wherein the catalog item data includes a catalog item category.

* * * * *